United States Patent Office 3,646,044
Patented Feb. 29, 1972

3,646,044
PRECIPITATION COPOLYMERIZATION OF MALEIC ANHYDRIDE IN AQUEOUS MEDIUM
Kazys Sekmakas, Chicago, Ill., assignor to De Soto, Inc., Des Plaines, Ill.
No Drawing. Filed May 21, 1969, Ser. No. 826,711
Int. Cl. C08f 33/00, 33/08
U.S. Cl. 260—296 H
19 Claims

ABSTRACT OF THE DISCLOSURE

Maleic compound, such as maleic anhydride, and vinyl monomer, such as styrene, are copolymerized in aqueous medium containing water-miscible organic solvent so that polymerization takes place in an aqueous medium to cause the copolymer to precipitate as it is formed. When maleic anhydride is used, it hydrolyzes in the aqueous medium so that the copolymer which is formed is an acid copolymer.

---

The present invention relates to the precipitation copolymerization of vinyl monomers, such as styrene, with maleic anhydride in aqueous medium.

Styrene and maleic anhydride have traditionally been polymerized in refluxing benzene at about 80° C. to produce a very high molecular weight heteropolymer which precipitated in the benzene polymerization medium. The high molecular weight of the polymer limited its solubility and the excessive proportion of maleic groups was not only costly, but it provided an excessive cross-link density when the polymer was cured. Also, the polymerization reaction was slow and dangerous (highly exothermic) and it was necessary to proceed at low solids content.

More recently, the polymerization of these same monomers has been carried out at higher temperature, in the presence of a molar excess of styrene and in organic solvents capable of dissolving the polymer product. In these circumstances lower molecular weight polymers were formed and, at very high temperature, the normal monomer reactivities were found to be altered and anhydride copolymers containing large excesses of styrene could be formed. These products found favor because they were more soluble, were lower in cost, and possessed a reduced cross-link density. However, the copolymers containing excess styrene still possessed a considerable number of maleic groups and these groups provided anhydride functionality. Conversion of the anhydride to acid by hydrolysis is costly and difficult so that acid derivatives were normally formed by half esterification, e.g., with butanol. Thus, and despite the recent advances in the art, it is desirable to reduce the temperature needed to force copolymerization and to lower the molecular weight of the product to further improve solubility and reduce the number of maleic groups per molecule.

As will be gathered from the foregoing, the art has connected low reaction temperature and precipitation polymerization with high molecular weight and heteropolymerization.

The present invention is founded on the discovery that when dissolved maleic compound and vinyl monomer copolymerizable therewith are supplied to an aqueous heel containing water-miscible organic solvent and free radical polymerization catalyst maintained under conditions of elevated temperature causing polymerization, an acid copolymer is formed which precipitates in the aqueous medium before it can acquire any large molecular weight. The organic solvent maintains the monomers in solution and the proportion of water is sufficient to cause the copolymer to precipitate as it is formed. Preferably, maleic anhydride is selected and water-miscible organic solvent is included in the monomer supply to help dissolve the monomers, though the maleic compound can be dissolved in liquid vinyl monomer.

Any maleic compound including maleic acid and alkyl and hydroxy alkyl esters thereof (both half esters and bisesters) can be used, but maleic anhydride is particularly preferred since it is less costly and more soluble than the corresponding acid.

In the invention, hydrolysis may precede or be simultaneous with polymerization to form an acid copolymer. Even when maleic acid is supplied to the aqueous heel, it is preferably provided by preheating a monomer feed containing the anhydride to cause hydrolysis immediately prior to use.

Low molecular weight copolymers are formed by precipitation copolymerization which may be conducted at lower temperatures than were previously needed to cause maleic anhydride to form a copolymer and the reaction may be conducted at higher solids content. The separation of the products is quite advantageous. Thus, much of the water-miscible organic solvent becomes associated with the acid copolymer and settles therewith to form a separate, usually gummy, layer at the bottom which contains very little water. Correspondingly, an upper aqueous layer is formed, which can be recycled if desired, but it contains very little resin solids and much of the organic solvent has been removed therefrom by association with polymer so that this aqueous layer can be economically discarded either in whole or in part.

Numerous advantages accrue from the foregoing among which should be noted.

(1) The acid copolymer is highly reactive and easily converted to an hydroxy polymer by reaction with epoxide. Monoepoxide is particularly appropriate, but polyepoxides can be used with greater ease and in larger amount because the very low molecular weight of the polymer reduces the danger of gelation.

(2) The acid copolymer is highly soluble in either water (with the aid of a base) or organic solvent.

(3) The acid copolymer is formed in the presence of very little organic solvent which facilitates the provision of substantially 100% solids materials of high reactivity for use in liquid or solid molding compositions or in powders for powder coating.

(4) The hydroxy ester polymers constitute one of the lowest cost and most highly soluble resinous polyols available and are easily provided with a residual acidity providing an acid number of from 5–50, preferably from 10–25, to permit dispersibility in water with the aid of a base and internal catalysis promoting cure with aminoplast resins.

Other advantages will be evident from the dscussion which follows:

The copolymerization reaction in the invention is carried out in the presence of free radical polymerization catalyst and at a temperature which causes release of the desired free radicals. With the more usual catalysts, this takes place at a temperature of 75° C. and above. Preferably, a polymerization temperature in excess of about 90° C. is used to speed the reaction and assure substantially complete conversion to copolymer. A satisfactory reaction rate can be obtained at about 78–80° C. using a heel of water containing a proportion of methyl ethyl ketone which boils at about this temperature, but unless the reaction time is greatly extended, the conversion is only about 80%. It is quite desirable to use a reaction temperature of about 100° C. in an aqueous medium containing a higher boiling water miscible organic solvent such as 4-methoxy-4-methyl-pentanone-2. Higher temperature operation using pressure to maintain the liquid phase is also contemplated.

The free radical generating polymerization catalysts are well known and illustrated by benzoyl peroxide and azobisisobutylronitrile. One simply selects the agent which liberates free radicals at the selected temperature. The catalyst is preferably dissolved in the monomer solution and introduced with the monomers into the preheated aqueous heel.

The copolymerization reaction is normally strongly exothermic, but this is controlled by incremental addition of monomers and also by the capacity of water to consume the heat of reaction (by boiling if need be).

It is to be noted in passing that alkylene oxide has previously been combined with copolymers containing both acid and anhydride functionalities but experience has demonstrated that when the conditions of reaction are sufficient to cause significant consumption of acid by hydroxy ester production, that the hydroxy groups so generated react with the anhydride groups to cross-link the resin and cause premature and uncontrolled gelation. Even when gel particles are not formed, the desired hydroxy functionality is unnecessarily consumed.

Accordingly, the invention requires the substantially complete conversion of the anhydride groups to acid groups which is difficult to achieve after polymer formation is completed.

The preferred monomer for reaction with the maleic compound is styrene, but other monovinyl compounds and particularly mononuclear aromatic hydrocarbons including halogen derivatives thereof are useful. Styrene and vinyl toluene are especially preferred. Even lower olefins such as ethylene, propylene and butylene may be used to obtain the benefits of simultaneous copolymerization and hydrolysis so as to directly produce an acid copolymer.

The invention is particularly directed to the situation in which about two or more mols of styrene or the like are used per mol of maleic anhydride. In this situation, the excess styrene facilitates dissolution of the maleic anhydride which minimizes the proportion of water-miscible solvent which must be present in the monomer supply. Indeed, when about three or more mols of styrene are used per mol of maleic anhydride, water-miscible solvent in the monomer feed can be eliminated. From the product standpoint, low maleic content is combined with very low molecular weight so that the number of available maleic groups per molecule is reduced to a minimum where the economic advantage is greatest. On the other hand, now that a polymer containing the desired low ratio of maleic groups has been formed in a practical manner it is desirable for some purposes to build molecular weight and this is done in a particularly effective manner by dehydrating the product and then reacting with organic diisocyanate which consumes hydroxy functionality. Dehydration is easily achieved by adding benzene or xylene and azeotroping out the water. The invention permits more urethane groups to be generated without gelation because of the lower molecular weight of the copolymer and the increased spacing between the maleic groups. It is also necessary to leave hydroxy groups unreacted for subsequent cure with, for example, an aminoplast resin. Moreover, some copolymer acidity is desirably retained to serve as an internal catalyst or for water dispersibility. The value of obtaining an acid copolymer per this invention and of using reaction with epoxide to generate two hydroxy groups for each maleic group shuold be evident from the above.

It is to be observed that some of the monomers are normally gaseous, but pressure can be used to maintain the liquid phase. In this respect vinyl chloride can be used to provide vinyl chloride-maleic acid copolymers or hydroxy ester derivatives thereof.

Copolymer insolubility in the aqueous polymerization medium leads to very low molecular weight in the preferred practice of the invention, but this is not an essential of the invention in all instances, e.g. where ethylene is used.

While the monomers copolymerized preferably consist essentially of styrene or homologs thereof such as vinyl toluene, and maleic anhydride, other monoethylenic monomers such as ethyl acrylate or other acrylic or methacrylic esters such as methyl methacrylate or isobutyl acrylate may be present to further complex the copolymer. Maleic esters and especially bis-hydroxy maleates such as bis-hydroxy propyl maleate can be used to ease the burden of dissolving the maleic anhydride, but this is not necessary when enough styrene is used. Even maleic acid or fumaric acid can be used to the extent it can be placed in solution.

The specific nature of the water-miscible organic solvent is of secondary importance so long as it is either inert with respect to the monomers copolymerized and the copolymer acid formed or reactive with acid to generate hydroxy ester groups. Thus, a monoepoxide may be present in the solvent to react with the acid groups generated therein. Appropriate solvents are ketones such as methyl ethyl ketone, diethyl ketone and 4-methoxy-4-methyl-pentanone-2, pressure being used where needed to maintain the liquid phase. Ester solvents such as 2-ethoxy ethanol acetate or 2-butoxy ethanol acetate are also quite useful.

After the copolymerization has been concluded, alcoholic solvents can be added, such as butanol and the like, and the reaction with alkylene oxide in the presence of an alkaline catalyst can be carried out even though the hydroxy solvent is present. This is because the alkylene oxide in the presence of alcoholic solvent reacts preferentially with acid groups in the copolymer. On the other hand, and when subsequent reaction with diisocyanate is intended, alcoholic solvents cannot be used.

The proportion of water-miscible organic solvent will vary. Thus, in the monomer feed sufficient solvent must be used to substantially completely dissolve the monomers which are to be copolymerized. A proportion of water-miscible solvent is needed in the heel to retain the monomers in solution, but the mixture of organic solvent with water in the heel should be essentially aqueous so that the copolymer is forced to precipitate as it is formed. Molecular weight can be varied somewhat by adjusting the proportion of water-miscible solvent in the heel so as to vary the insolubility of the mixture.

Small amounts of water-immiscible solvent may be present, but this does not interfere with the water phase system which is under consideration unless the monomers are dissolved in the water-immiscible solvent in which case such monomers would not fully participate in the polymerization reaction.

Any monoepoxide may be used for reaction with the acid groups which are generated, though alkylene oxides are preferred. While the monoepoxide is preferably reacted with the preformed acid copolymer, it can be present in the solution of monomers for simultaneous reaction along with the hydrolysis and copolymerization reactions.

The monoepoxide used should be free of functional groups which would interfere with the reaction between the acid copolymer and the oxirane group of the epoxide. The preferred monoepoxides are the $C_2$–$C_4$ oxides such as ethylene oxide, propylene oxide, and butylene oxide.

The low molecular weight aliphatic compounds are superior from the standpoint of water solubility. However, styrene oxide can be used though it is less preferred. Also, higher molecular weight monoepoxides can be used, but these are, again, less preferred.

On the other hand, alpha-branched saturated monocarboxylic acids and especially tertiary fatty acids in the form of a glycidyl ester are quite good and provide reactive hydroxy esters which have good compatibility with water and which help to provide desirable physical properties in the final resin product. These have the formula:

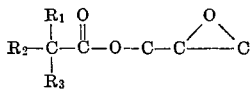

in which $R_1$ and $R_2$ are alkyl radicals having a chain length of from 2–18 carbon atoms and $R_3$ is the same as $R_1$ and $R_2$ or hydrogen. The compound in which $R_1$, $R_2$ and $R_3$ are all alkyl radicals containing from 9–11 carbon atoms is particularly preferred.

The reaction with monoepoxide is easily carried out at moderate temperatures and the reaction quickly goes to substantial completion. Appropriate temperatures are in the range of 150–350° F., preferably from 200–300° F. The epoxide may be used in stoichiometric deficiency with respect to the acid groups which are available so that desired acidity may be retained to preferably provide a final acid number in the range of from 5–50, more preferably 10–30. A small amount of an amine or other alkaline material is advantageously used in order to promote the carboxy-epoxy reaction. The consumption of the carboxyl groups in the acid copolymer is easily followed by observing the acid number of the hydroxy ester product as it is produced.

While monoepoxides, and especially alkylene oxides. are preferred to generate hydroxy functionality and enhance water dispersibility, it is also possible to use polyepoxides, especially in combination with the monoepoxide. Thus, diepoxides are particularly useful since they simultaneously increase molecular weight and generate hydroxy functionality. Usually such polyfunctional agents introduce gelation difficulties, but these are minimized in the invention. Diepoxides such as diglycidyl ethers of bisphenols such as bisphenol A or of aliphatic polyhydric alcohols, such as ethylene glycol, illustrate useful polyepoxides.

It is preferred to extend the chain of the hydroxy polymer by polyurethane formation because this reaction has been found to be easily controlled by regulating isocyanate addition at moderate temperature until a predetermined viscosity is reached. The reaction is with the hydroxy groups and the desired acidity of the copolymer is substantially fully retained.

The organic polyisocyanate is preferably a diisocyanate, and more preferably an aliphatic diisocyanate. The aromatic diisocyanates are useful and form a well known class which is illustrated by toluene diisocyanate. The aliphatic diisocyanates preferably include a divalent hydrocarbon radical containing at least 6 carbon atoms, preferably more than 10 carbon atoms. The hydrocarbon group may be straight, branched, or cyclic since all of these are useful in the practice of the invention. The diisocyanates are particularly preferred since higher functional compounds are troublesome with respect to gelation and water dispersibility, but can be used in small amount if care is taken.

Examples of aliphatic diisocyanates which may be used include dicyclohexane - 4,4'-diisocyanate, tetramethylene diisocyanate, hexamethylene diisocyanate, and the like. Especially desirable is 4,4' methylenebis (cyclohexyl isocyanate) which is a cycloaliphatic compound. Also useful are the diisocyanates based on fatty acid dimers such as that produced by dimerizing a C 18 fatty acid to obtain an aliphatic diisocyanate based on a 36 carbon divalent hydrocarbon radical.

The invention may use a small proportion of diisocyanate, e.g. 0.25–10%, preferably 0.5–5% of diisocyanate based on the weight of the hydroxy ester copolymer and this is preferred where dispersibility in water with the aid of a base is desired. On the other hand, as the proportion of diisocyanate increases, excellent organic solvent solution properties are obtained and the polyurethane characteristics begin to dominate. The very low molecular weight products of the invention can tolerate more diisocyanate without gelation up to about 30% by weight. Of course, a stoichiometric deficiency of diisocyanate is essential and it is preferred to use a ratio of hydroxy to isocyanate of from 2:1 to 50:1, preferably from 4:1 to 30:1.

The aliphatic diisocyanates are particularly preferred because they contribute superior color properties.

The resins of the invention preferably include unreacted acid groups since these enable the resin to be dispersed in water with the aid of a base. These acid groups also are valuable in providing an internal catalysts of the cure which will be discussed hereinafter, and they enable electrodeposition from aqueous dispersion which will also be discussed hereinafter.

The resins of the invention are preferably cured using an aminoplast resin. The term "aminoplast resin" is a common one used to define heat-hardening condensation products of amines and especially triazines with excess formaldehyde. Condensation products of excess formaldehyde with melamine, benzoguanamine, and urea constitute typical aminoplast resins and the resins of the invention exhibit good compatibilty with such materials. The condensation reaction, as is well known, is normally carried out in alcoholic solvent medium, such as methanol, ethanol, butanol or higher alcohol. Broadly, the methylol groups of the aminoplast react with the hydroxy groups of the copolymer hydroxy ester to provide the cure. When the copolymer is dispersed in water and electrodeposited the aminoplast may be used in water soluble or water dispersible form and proportions of 1–40%, preferably 5–30%, based on total resin, are used to form films which cure when baked at moderate temperature. Water insoluble aminoplast resins are particularly preferred for electrocoating in accordance with the invention, e.g., benzoguanamine-formaldehyde condensates.

It is to be stressed that the acidity of the partial hydroxy ester is especially significant since it enables dispersion in water with the aid of a base, enhances compatibility and catalyzes the aminoplast cure. In turn, the aminoplast cure is aided by the presence of an adequate hydroxy functionality in the resinous hydroxy ester.

The films deposited in accordance with the invention are baked to cure the same. Appropriate baking temperatures are from 300–500° F. for periods varying from about 30 seconds at the highest baking temperatures to about an hour at the lowest temperatures.

The resins used can be applied clear or pigmented. The examples herein deposit clear films to minimize extraneous factors. In normal practice, these resins are frequently pigmented, the pigment being incorporated in the water free resin solution. Normal pigmentation is illustrated by titanium dioxide rutile incorporated by simple ball milling. A typical pigment to binder ratio for electrocoat application is substantially 0.4:1, though this ratio may vary from 0.1:1 to 1:1 or higher, values of 0.3:1 to 0.5:1 being more usual. The only caution to be observed is to avoid those pigments which are unduly sensitive to water. Corrosion resistant pigments may be used, but this is not essential. For solvent application, conventional pigmentation is fully appropriate.

For electrodeposition in accordance with the invention, the resins are dispersed in water, preferably using a nitrogenous base, such as an amine, e.g., triethyl amine, with the pH of the aqueous bath being approximately in the range of from about pH 6 to about pH 11, preferably pH 7.5 to 10. The aqueous electrocoating bath has a resin solids content of from 1–20%, preferably from 5–15%.

The invention is illustrated in the examples which follow.

EXAMPLE 1

Preparation of styrene-maleic anhydride copolymer (3:1 molar ratio) charge composition (parts by weight):

700 distilled water
250 4-methoxy-4-methyl-pentanone-2,3-triethyl amine
  Charge the foregoing into a 3 liter reaction equipped with an agitator, monomer addition funnel, thermometer, and nitrogen inlet tube. Heat to 98° C.
312 styrene (3 moles)
98 maleic anhydride (1 mole)
100 4-methoxy-4-methyl-pentanone-2
20 azobisisobutyronitrile
  Dissolve maleic anhydride in styrene and solvent and add catalyst. Add to reactor over a 2–3 hour period of 95–98° C. Hold 1 hour.
2 azobisisobutyronitrile—Add, and hold 1 hour.
2 azobisisobutyronitrile—Add, and hold 1 hour.
2 azobisisobutyronitrile—Add, and hold 1 hour for complete conversion.

Turn off agitation and allow the copolymer to settle to the bottom of the reactir (hold 3–4 hours). Decant top clear layer containing 0.7% solids (780 parts of clear liquid decanted). Then add to the reactor 100 parts of 2-ethoxy ethanol and 202 parts of triethyl amine (100% amine-acid neutralization). The copolymer forms a clear solution after holding for one hour at 90° C.

The final characteristics of the styrene-maleic acid copolymer are as follows:

Solids (percent) _____ 44
Viscosity (Gardner) _____ D–E
Color (Gardner-Holdt) _____ 1
Viscosity (standard poise) _____ 1.25

The above copolymer was diluted with deionized water to 10% solids and formed a clear water solution. This establishes that a copolymer was formed since polystyrene is not soluble in aqueous medium.

20% of heat-hardening, water-dispersible melamine-formaldehyde resin (based on the weight of the above copolymer) was incorporated into the above water solution. Steel panels were coated by imposing a direct current on the metal container (cathode) and on the steel panels (anode). The panels are coated at 100 volts to deposit a film which, after baking for 20 minutes at 400° F., cures to a solvent resistant, pore free, hard coating. The coating exhibits 3H pencil hardness and is insoluble in toluene. Despite the desirable final properties, the deposited film was sensitive to water prior to baking and the deposition voltage was limited.

Referring to commercially available materials, American Cyanamid melamine-formaldehyde condensate XM-1116 may be used as the melamine-formaldehyde resin in the above example.

Comparison of copolymer of Example 1 with commercial styrene-maleic anhydride copolymer A commercial 3:1 styrene-maleic anhydride copolymer (Sinclair product 3000 A) was dissolved in the same solvent combination as used in Example 1 and neutralized with triethyl amine (100% neutralization) and adjusted to 44% non-volatile solids.

The viscosity of the above commercial styrene-maleic copolymer was 18 poises as compared to 1.25 poises for the present example, demonstrating that the invention produces a copolymer of far lower molecular weight than the very low molecular weight commercial comparison.

EXAMPLE 2

Preparation of hydroxy polymer utilizing dispersion polymerization technique

Example 1 was repeated again utilizing 3 moles of styrene and 1 mole of maleic anhydride.

The copolymer so-formed was allowed to settle for four hours and the clear supernatant aqueous layer was decanted leaving, in the reactor, 680 parts of polymer slurry (a gummy layer) at 61% solids, which corresponds to 99% polymer solids recovery. Most of the volatiles are organic solvent, the gummy layer containing only about 3% water, based on copolymer solids.

Preparation of hydroxy copolymer (parts by wt.)

680 copolymer slurry of Example 2 (61% solids)
30 triethyl amine
150 2-ethoxy ethanol
  Charge the above into reactor and heat to 90° C. using agitation.
110 butylene oxide—add via addition funnel over a one hour period. Hold at 90° C. for an acid value of less than 20.

The final characteristics of the hydroxy copolymer are:

Solids (percent) _____ 48.1
Viscosity (poises) _____ 2.5
Acid value _____ 19.1

The copolymer solution of Example 2 was blended with 20% of hexamethoxy methyl-melamine (based on the weight of the copolymer) and films of the above solvent coating composition were drawn down on steel panels and baked for 20 minutes at 350° F. The thickness of the coating was 0.65 mil.

The following results are obtained:

Adhesion to metal _____ Excellent.
Pencil hardness _____ 4H–5H.
Forward impact (inch/lbs.) _____ Pass 25.
Toluol resistance _____ Excellent.
Recoat adhesion _____ Excellent.

EXAMPLE 3

The 48.1% solution of hydroxy copolymer of Example 2 is 100% neutralized with triethyl amine and dispersed in deionized water to 10% solids and 20% of heat-hardening, water-dispersible melamineformaldehyde resin in added as in Example 1. Upon electrodeposition as in Example 1, results comparable with those obtained in Example 1 are obtained except that the wet film as deposited is less sensitive to water prior to baking and higher deposition voltages can be used if desired.

EXAMPLE 4

The 48.1% solution of hydroxy copolymer of Example 2 is dehydrated by adding benzene and refluxing at about 110° C. to azeotrope out the water present in the solution. Toluene diisocyanate is then added slowly to cause a ten-fold increase in the viscosity of the solution. This produces a polyurethane resin which is useful as described in Examples 2 and 3 in place of the hydroxy copolymers used in said examples, but the presence of the urethane linkages in the resin increases the toughness of the resin as evidenced by increased impact resistance and improved flexibility.

EXAMPLE 5

Part I.—Preparation of styrene copolymer

Charge composition (parts by wt.):
400 4-methoxy-4-methyl-pentanone-2
800 water
    charge the foregoing into a 3 liter reactor equipped with an agitator, monomer addition funnel, thermometer, and nitrogen inlet tube. Heat to 98° C.
315 styrene
33 maleic anhydride
170 isooctyl acid maleate
30 azobisisobutyronitrile
    Premix the above and add to the reactor over a 3 hour period while maintaining the temperature at 95–98° C. Hold 1 hour.

2 azobisisobutyronitrile—Add, and hold 1 hour.
2 azobisisobutyronitrile—Add, and hold 1 hour.
2 azobisisobutyronitrile—Add, and hold 1 hour for complete conversion.

Cool to 28° C. and allow the copolymer to settle to the bottom of the reactor (hold 4 hours). Decant top clear layer (water) containing 0.1% solids. To the bottom layer (solid precipitate), add 150 grams toluene and proceed as described in Part II in order to prepare a high molecular weight urethane resin.

Part II.—Preparation of high molecular weight urethane resin 960 solid layer of Part I
150 toluene
    Set empty trap. Heat to 120° C. and collect water in trap (2 hours). Check acid value: 67.3
15 triethyl amine—Add
72 butylene oxide—Add over a 15–20 minute period and hold at 120° C. for an acid value of less than 12. Actual acid value of 8.7 and viscosity of V (Gardner Holdt)—8.8 poises.
32 toluene diisocyanate—Add over a 20 minute period and hold for one hour at 120° C. The product is then cooled to provide the following final characteristics:

| | |
|---|---|
| Solids (percent) | 62.5 |
| Viscosity (98.5 poises) | $Z_5$ |
| Color | 7–8 |
| Acid value (nonvolatile) | 8.0 |

The 62.5% solids solution urethane resin of Example 5, Part II, are blended with 30% hexamethoxy methylmelamine (based on the weight of the resin) and films of the solvent coating composition are drawn down on steel plate and baked for 30 minutes at 375° F. to cure the same. The cured films have a pencil hardness of 4H, they pass a 40 in./lbs. forward impact test, and they are insoluble in methyl ethyl ketone as evidenced by the fact that they withstand 50 double rubs with a ketone-saturated cloth without showing film softening or removal.

These systems of the present example show promise for use in flexible, abrasion and chip-resistant enamel coatings of the type used for corrosion resistant appliance finishes.

The above example will serve to illustrate various modifications which can be tolerated in accordance with the invention. Thus, the monomer feed in the above example is entirely free of water-miscible organic solvent. Moreover, a portion of the maleic compound is in the form of a partial ester. Still further, the example illustrates the removal of water and the production of a polyurethane resin of relatively high molecular weight. It also illustrates the cure of the copolymer with aminoplast resin in order to provide an outstanding combination of film hardness and impact resistance.

It is also of interest to note that the copolymers of the invention are of unusual uniformity possessing a heterogeneity index which is consistently less than 2.5. In contrast, the heterogeneity index of commercially available low molecular weight styrene/maleic anhydride copolymers containing large proportions of copolymerized styrene is much higher than 2.5, typical commercial products having a heterogeneity index of about 3.9.

The invention is defined in the claims which follow.

I claim:

1. A method for the copolymerization of maleic compound and vinyl monomer copolymerizable therewith to produce an acid copolymer comprising, supplying dissolved maleic compound selected from the group consisting of maleic anhydride, maleic acid, and alkyl and hydroxy alkyl esters thereof and monovinyl monomer copolymerizable therewith selected from mononuclear aromatic hydrocarbons including halogen derivatives thereof to an aqueous heel containing water-miscible organic solvent and free radical polymerization catalyst maintained at an elevated polymerization temperature to force copolymerization to take place, the proportion of water in said aqueous heel being sufficient to cause the copolymer to precipitate as it is formed.

2. A method as recited in claim 1 in which said aqueous heel is maintained at a temperature of at least about 90° C.

3. A method as recited in claim 2 in which said vinyl monomer is styrene or a homolog thereof.

4. A method as recited in claim 3 in which said maleic compound and said vinyl monomer are supplied to said aqueous heel in solution in water-miscible organic solvent.

5. A method as recited in claim 4 in which said solution contains said free radical polymerization catalyst.

6. A method as recited in claim 3 in which said vinyl monomer is present in an amount of at least about 2 mols thereof per mol of maleic compound.

7. A method as recited in claim 1 in which said organic solvent has a boiling point above the boiling point of water and said heel is maintained at a temperature of about 100° C.

8. A method as recited in claim 1 in which said precipitate is permitted to settle and form a gummy layer.

9. The gummy material produced by the method of claim 8.

10. A method for the copolymerization of maleic anhydride and styrene copolymerizable therewith to produce an acid copolymer comprising supplying said maleic anhydride and said styrene dissolved in water miscible organic solvent to an aqueous heel containing water-miscible organic solvent and free radical polymerization catalyst and maintained at an elevated polymerization temperature to force hydrolysis and copolymerization to take place, the proportion of water in said aqueous heel being sufficient to cause the copolymer to precipitate as it is formed.

11. A method as recited in claim 10 in which said vinyl monomer is styrene or a homolog thereof and said aqueous heel is maintained at a temperature of at least about 90° C.

12. A method as recited in claim 10 in which said maleic anhydride is copolymerized with at least about 2 mols of styrene per mol of maleic anhydride.

13. A method of producing a low molecular weight acid copolymer comprising forming a solution of maleic anhydride, at least 2 mols of styrene or vinyl toluene per mole of maleic anhydride and free radical polymerization catalyst in water-miscible organic solvent incrementally supplying said solution to an aqueous heel containing water-miscible organic solvent maintained at an elevated polymerization temperature of at least agout 90° C., whereby said maleic anhydride is substantially completely hydrolized and copolymerized with said styrene or vinyl toluene, the proportion of water in said aqueous heel being sufficient to cause the copolymer to precipitate as it is formed.

14. A method as recited in claim 13 in which at least about 3 mols of styrene are used per mol of maleic anhydride.

15. A gummy water-containing, low molecular weight acid copolymer of maleic acid and at least about 2 mols of copolymerized styrene per mol of maleic acid, said copolymer having a heterogeneity index of less than about 2.5.

16. An hydroxy functional copolymer produced by reacting the gummy acid copolymer of claim 15 with an epoxide compound.

17. An hydroxy functional copolymer as recited in claim 16 having an acid number in the range of from 5–50.

18. A method as recited in claim 13 in which a maleic ester is also supplied to said aqueous heel.

19. A copolymer as recited in claim 15 including a proportion of copolymerized maleic ester.

References Cited

UNITED STATES PATENTS

| | | | |
|---|---|---|---|
| 2,565,147 | 8/1951 | Pfluger | 260—78.5 |
| 2,607,761 | 8/1952 | Seymour | 260—78.5 |
| 3,000,840 | 9/1961 | Johnson et al. | 260—8 |
| 3,297,657 | 1/1967 | Gray et al. | 260—78.5 |
| 3,404,135 | 10/1968 | Tietz | 260—78.5 |

MELVIN GOLDSTEIN, Primary Examiner

U.S. Cl. X.R.

117—132 B, 230; 204—181; 260—47 EP, 77.5 AP, 78.5 R, 78.5 T, 851, 856